April 17, 1962 — C. B. FISHER — 3,029,789
TURKEY CAGE BOTTOM
Filed Sept. 26, 1960
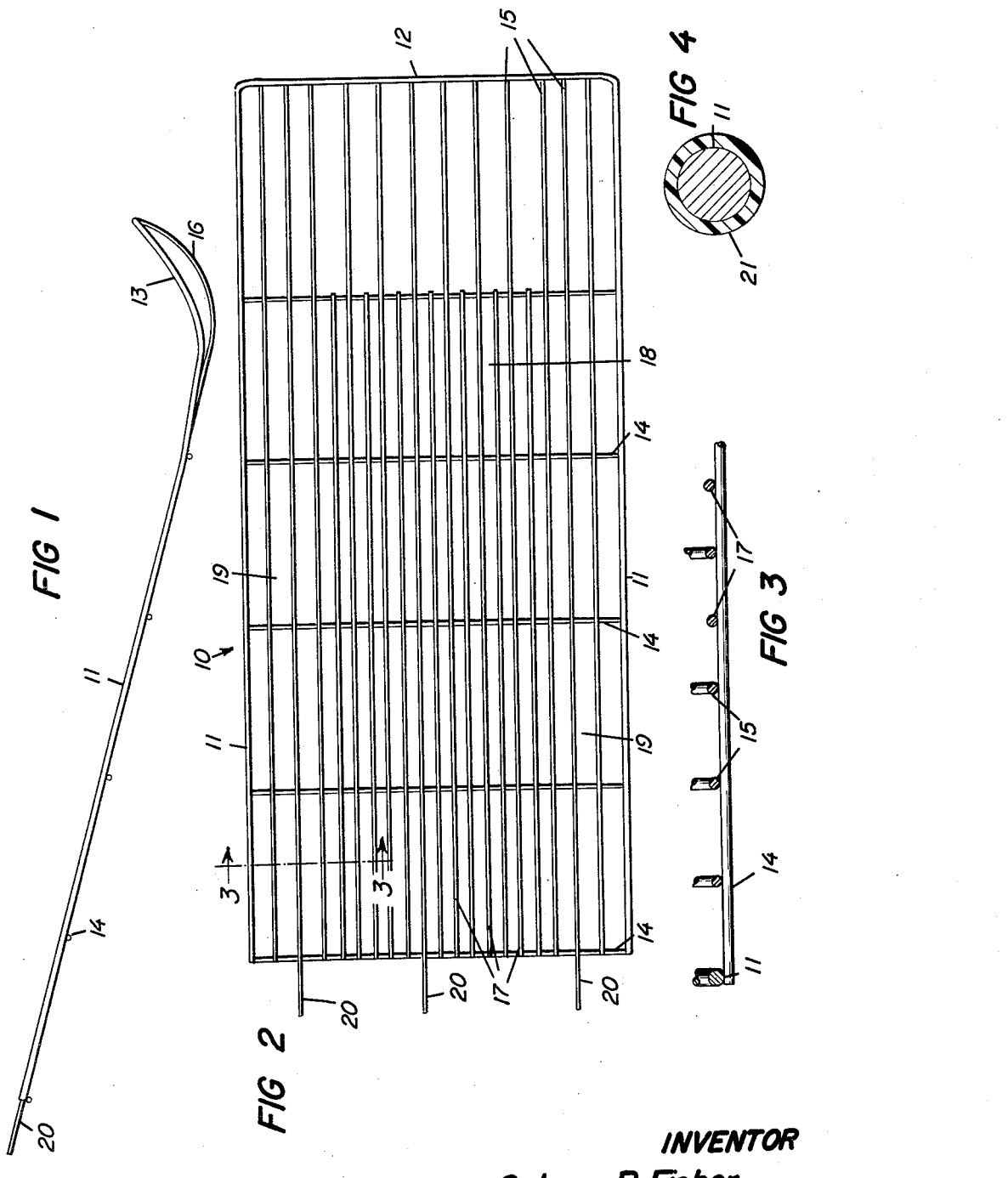
INVENTOR
Coburn B Fisher

United States Patent Office 3,029,789
Patented Apr. 17, 1962

3,029,789
TURKEY CAGE BOTTOM
Coburn B. Fisher, P.O. Box 421, Newcastle, Calif.
Filed Sept. 26, 1960, Ser. No. 58,325
3 Claims. (Cl. 119—48)

This invention relates generally to bird cages and more specifically to improvements in turkey cage bottoms.

The use of some form of false bottom which is designed to permit eggs to roll out of the cage before becoming damaged by the laying bird is rapidly becoming an accepted practise. Such devices are time saving and are considered beneficial to the birds in that they prevent broodiness, and further they avoid possible pre-incubation of the layed egg which immediately rolls to a cooler area. Presently known cage bottoms are unsatisfactory in several respects. In the first place, the bottom normally consists of a welded wire framework which tends to create discomfort for the bird, and often results in sore feet. Such discomfort will result in poor laying.

It is therefore a primary object of this invention to provide a removable cage bottom which is constructed so as to provide maximum comfort for the bird.

It is a further object of this invention to provide a removable cage bottom which is provided with wider mesh along each side to reduce contamination of the bottom by droppings.

It is a still further object of this invention to provide a removable cage bottom which is coated with a thick layer of plastic material to prevent deterioration and provide protection for the eggs layed thereon.

The invention consists of a substantially rectangular frame curved upwardly at one end to provide an egg arresting pocket. The frame is made of wire having sides which are connected by a raised cross wire. Transverse members extend between the sides and are secured to the underside thereof. Base wires are spaced parallel to the sides across the width of the frame and curve at their ends to seal with the cross wire. Rods extend parallel to and between some of the base wires to form a closely grilled surface centrally of the frame. The complete assembled frame is coated with plastic material.

A full understanding of the construction of this invention, together with further novel features and advantages, will be had from the following detailed description of a preferred embodiment thereof, taken in conjunction with the attached drawings wherein:

FIG. 1 is a side elevation of the frame of my invention showing the upturned egg collecting portion.

FIG. 2 is a plan view of the removable cage bottom showing the preferred arrangement of the wire frame structure.

FIG. 3 is a cross sectional end elevation taken along the line 3—3 of FIG. 1.

FIG. 4 is a cross sectional view of a typical wire used in the frame construction showing the plastic coating which is applied to the surface.

Similar reference characters indicate corresponding parts throughout the several views in the drawings.

Referring now to the drawing in detail, the numeral 10 represents a wire frame which is constructed by side wires 11 connected at one end by a cross wire 12. The connected ends of the side wires 11 are curved upwardly at 13 and may be bent to form the cross wire 12 from a single length of wire. The side wires 11 are retained in a parallel relationship by transverse members 14 which are equally spaced, parallel to each other, and secured by means such as welding to the underside of the two side wires. Base wires 15 extend along the complete length of the frame in an equally spaced manner across the width thereof and are secured to the upper surfaces of the transverse members 14. The forward end of each base wire 15 is curved upwardly at 16 and secured to the cross wire 12. A series of rods 17 are spaced centrally between the centrally disposed base wires 15 and extend between the transverse members 14 to which they are permanently secured. These rods provide a more closely grilled surface 18 in the centre of the frame, and give added protection and comfort to the bird. The side grill 19 remains a comparatively large mesh through which droppings will readily pass.

Three of the base wires 15 may extend at 20 rearwardly of the rear transverse member 14 to provide engaging lugs for supporting the rear end of the frame on the back of the cage.

After the frame is constructed, it is dipped one or more times in a bath of liquid plastic. Soft plastics such as polyethylene may be used successfully for this purpose. A coating 21 is thus provided over the entire framework. This coating, apart from providing increased comfort for the bird, cushions the drop of the egg as the bird lays, thereby eliminating cracking. It eliminates wire marks on eggs which commonly form when straight galvanized frames are used and resists acids from the droppings, resulting in longer life and simpler cleaning of the frame.

Referring to the foregoing description and to the drawing particularly FIGURE 2, it can be seen that the turkey cage bottom is structurally divided into different zones or areas, each of which serves a specific purpose.

The right-hand end, or egg arresting pocket, comprises the base wires 15 which are spaced apart a substantial distance. The reason for this wide lateral spacing of the wires is that a minimum amount of surface area is presented on which dust, dirt and other undesirable matter can lodge. It will be appreciated that when an egg which is still damp rolls down into the pocket it will pick up any dust or dirt or other matter on the wires forming the pocket and will thereby become dirty. By keeping these wires clean, the eggs are kept clean.

In the central portion of the cage bottom there is a turkey supporting zone, roughly defined by the area between the base wires 15 which have the outermost two lugs 20 extending rearwardly therefrom, and the area between the transverse wire 14 adjacent the beginning of the egg-arresting pocket and the transverse wire 14 forming the left-hand end of the device. Within this rectangular area, the area in which the turkeys stand, the longitudinal rods 17 are interspaced between the base wires 15 so as to provide a firm support for the feet of the turkeys. Without this close spacing, the pads on the turkeys' feet slip down between the wires and get caught, thus injuring them. The spacing is sufficient however, to permit dirt, dust and feathers to fall through the grill. The shuffling about of the bird is sufficient, in this support zone, to dislodge such things as dirt and feathers from the grill and thus keep the area free of such unwanted material. The bird, incidentally is not able to stand in the egg pocket zone since this area is outside the cage. Thus, the egg pocket area keeps clean, not because of the bird shuffling about, but because of the wide spacing previously referred to.

So, also, because of the bird's physical size and shape, it is ordinarily unable to stand on the opposite, outermost, widely spaced, longitudinal droppings zones, or side grill areas 19. So, here again, a close foot-supporting grillwork is not necessary. In fact, wide spacing is desirable since it allows the droppings from the bird to pass readily therethrough.

In sum, the device of the invention is characterized by at least three structurally different zones, each providing for a specific purpose and directed toward some characteristic of the bird being housed.

Having described the invention in a preferred form, it will be appreciated that some modifications may be made to the precise configuration, without departing from the scope or spirit of the invention, as defined by the following claims.

I claim:

1. A bird cage bottom comprising: an elongated rectangular wire framework having side wires curved upwardly at one end and connected by a front cross wire, the other end of said side wires being connected by an after cross wire; a plurality of transverse members extending between said side wires and secured thereto, the forward one of said transverse members being parallel to said front cross wire and spaced therefrom to define with the interposed upwardly curved portions of said side wires an egg arresting pocket; a plurality of longitudinal base wires curved upwardly at one end adjacent said egg arresting pocket and extending between said after cross wire and said front cross wire in parallel relation to said side wires, the lateral space between said base wires being sufficient to support an egg of the bird being housed; and a plurality of longitudinal rods interspaced between a plurality of centrally located ones of said base wires and extending between said after cross wire and said forward one of said transverse members, said rods forming with said base wires a central longitudinal closely grilled surface adapted to support a bird, the portions of said cage bottom between said central closely grilled surface and the adjacent of said side wires being interrupted only by base wires and forming a longitudinal pair of widely spaced grilled surfaces.

2. The device of claim 1 wherein said central longitudinal closely grilled surface is capable of passing dirt and bird feathers therethrough, said grilled surface including said longitudinal base wires and said longitudinal rods interspaced therebetween to provide a clearance between adjacent wires and rods of not less than one-eighth of an inch.

3. The device of claim 2 wherein said device is coated with plastic material.

References Cited in the file of this patent
UNITED STATES PATENTS

| | | |
|---|---|---|
| 2,264,959 | Sperry et al. | Dec. 2, 1941 |
| 2,612,862 | Ipsen | Oct. 7, 1952 |
| 2,695,006 | Tellefson | Nov. 23, 1954 |
| 2,766,723 | Sampermans | Oct. 16, 1956 |